United States Patent [19]

Mori

[11] Patent Number: 5,425,026
[45] Date of Patent: Jun. 13, 1995

[54] MULTI-PROTOCOL PACKET SWITCHING NETWORK

[75] Inventor: Naoki Mori, Tokyo, Japan

[73] Assignee: NEC Corporation, Tokyo, Japan

[21] Appl. No.: 177,527

[22] Filed: Jan. 5, 1994

[30] Foreign Application Priority Data

Jan. 5, 1993 [JP] Japan ................... 5-000144

[51] Int. Cl.6 ..................... H04J 3/24; H04L 12/56
[52] U.S. Cl. ................... 370/60; 370/85.13;
370/94.1; 370/94.3; 370/110.1
[58] Field of Search ................ 370/54, 60, 60.1, 79,
370/85.1, 85.13, 85.14, 94.1, 94.3, 110.1;
340/825.5, 825.51, 825.52

[56] References Cited

U.S. PATENT DOCUMENTS

| | | | |
|---|---|---|---|
| 4,668,214 | 8/1987 | DeWitt et al. | 370/60 |
| 4,899,333 | 2/1990 | Roediger | 370/60 |
| 4,975,905 | 12/1990 | Mann et al. | 370/85.1 |
| 4,975,906 | 12/1990 | Takiyasu et al. | 370/85.13 |
| 5,119,367 | 6/1992 | Kawakatsu et al. | 370/60 |
| 5,289,468 | 2/1994 | Yoshida | 370/85.13 |

OTHER PUBLICATIONS

A. Tantawy, et al., "A Scheme for Remote LAN Bridging Across SMDS MANs", Globecom '92, vol. 3, pp. 1642-1646, Orlando, Fla., Dec. 6, 1992.
K. R. Srivathsan, et al., "Implementation of OSI–IP Router for LAN—LAN", Int. Conf. on EC3-Energy, Computer, Communication and Control Systems, vol. 3, pp. 46-50, New Delhi, India, Aug. 28, 1991.

Primary Examiner—Alpus Hsu
Attorney, Agent, or Firm—Ostrolenk, Faber, Gerb & Soffen

[57] ABSTRACT

In a packet switched network, each network node has line and trunk ports to which LAN user terminals and links are connected and which are identified by a port address containing a node number plus a port number. Each of the user terminals transmits a first signaling packet when establishing a connection before sending information-bearing packets, containing in it a source network address which includes a protocol identifier and a source user address, and a destination network address which includes the same protocol identifier and a destination user address. Each network node includes a memory for establishing correspondences between the network addresses of remote user terminals, the port addresses of the remote user terminals, and the port numbers of the ports of the network node through which local user terminals are accessible to the remote user terminals. The network node responds to a second signaling packet received from a user by detecting in the memory a corresponding port address and a corresponding port number and appending the detected port address to the second signaling packet and transmitting it to one of the ports of the node according to the detected port number.

7 Claims, 9 Drawing Sheets

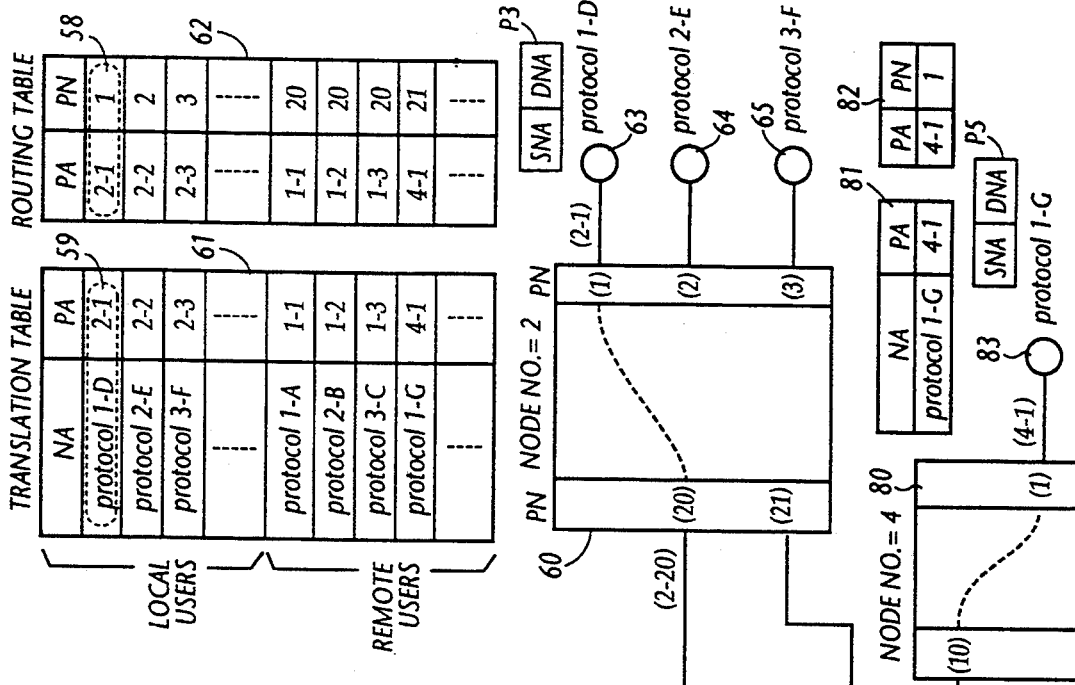
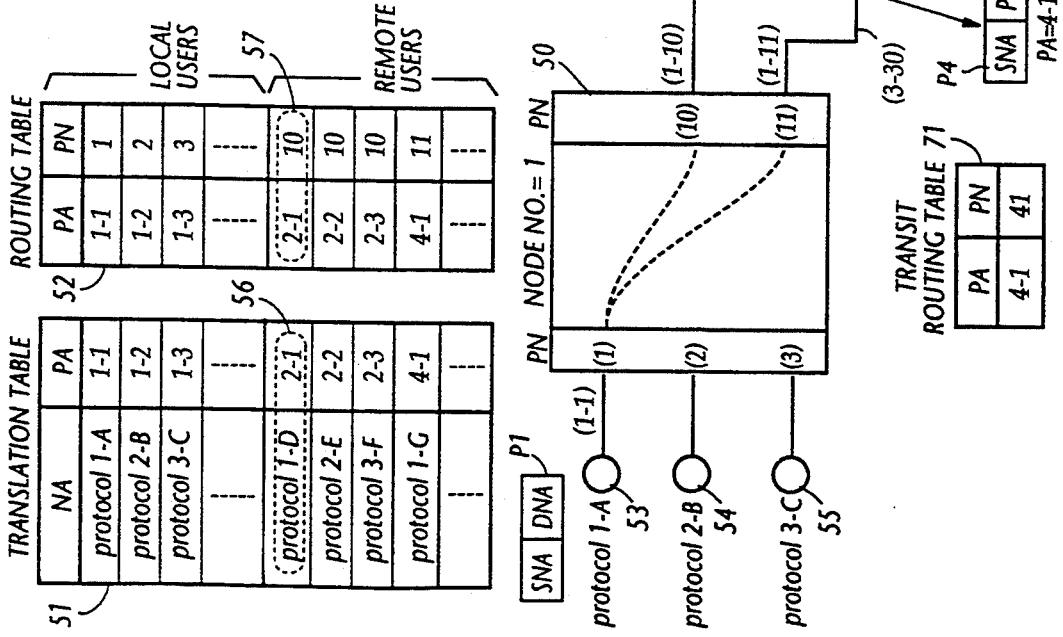
FIG. 3

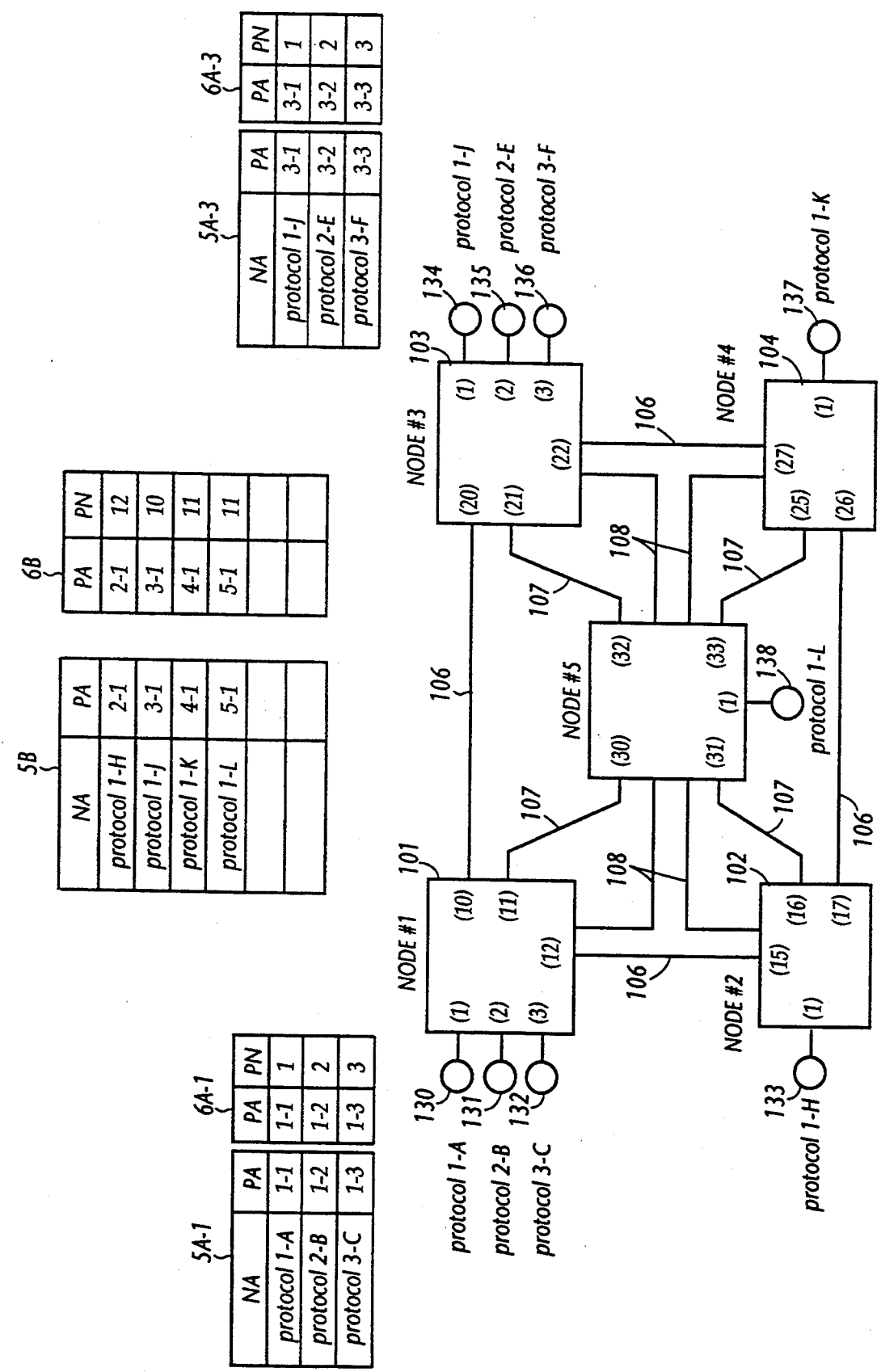

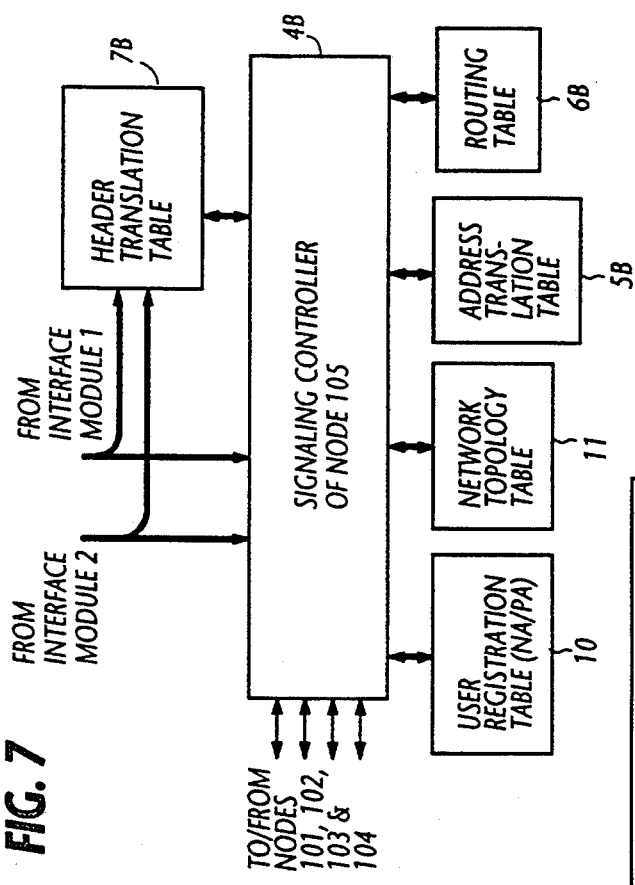
FIG. 7
FIG. 6
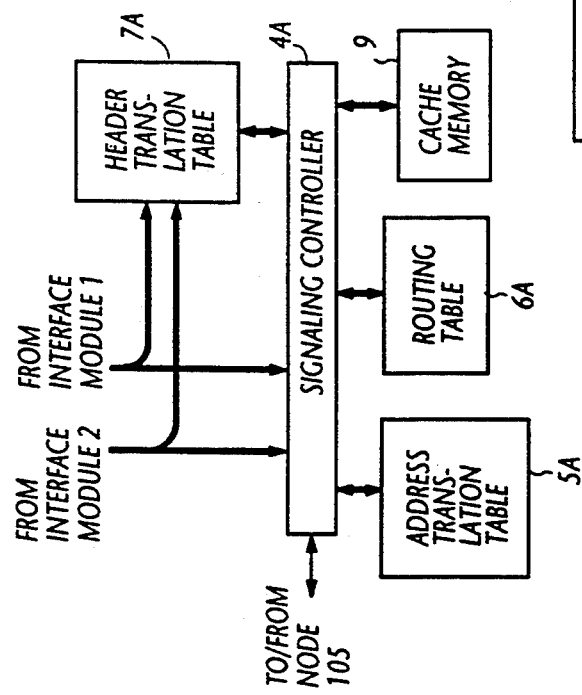
FIG. 8
NETWORK TOPOLOGY TABLE

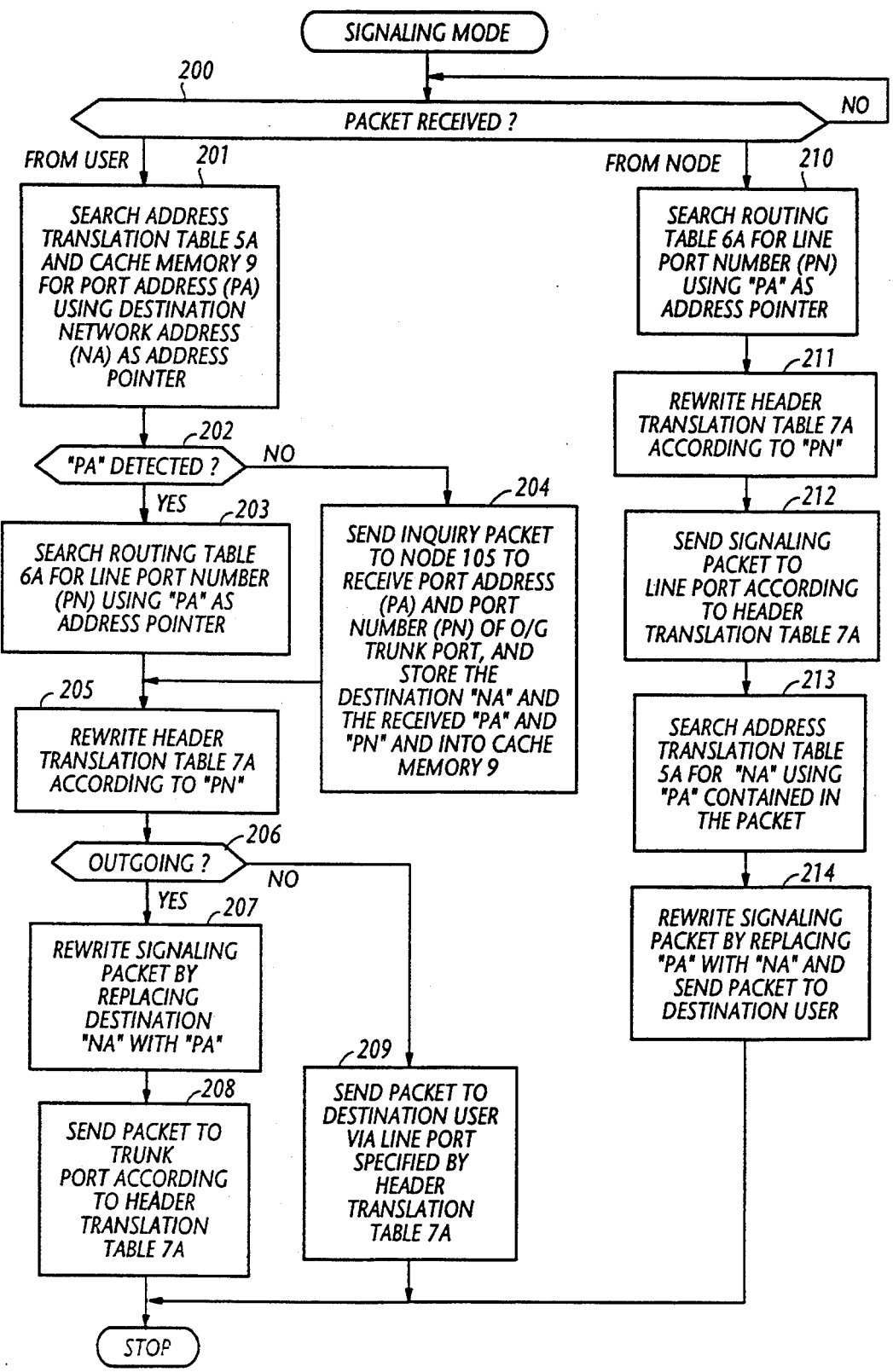

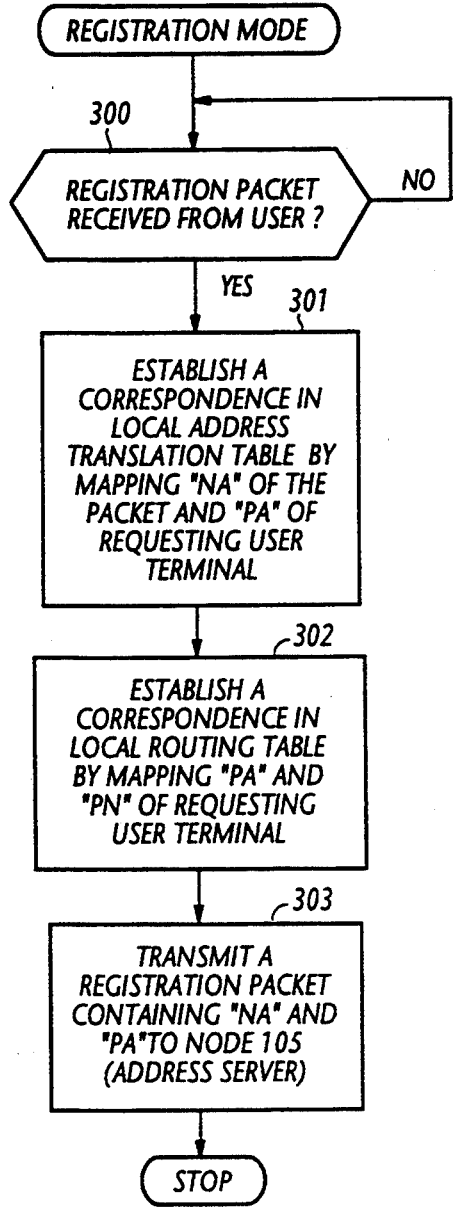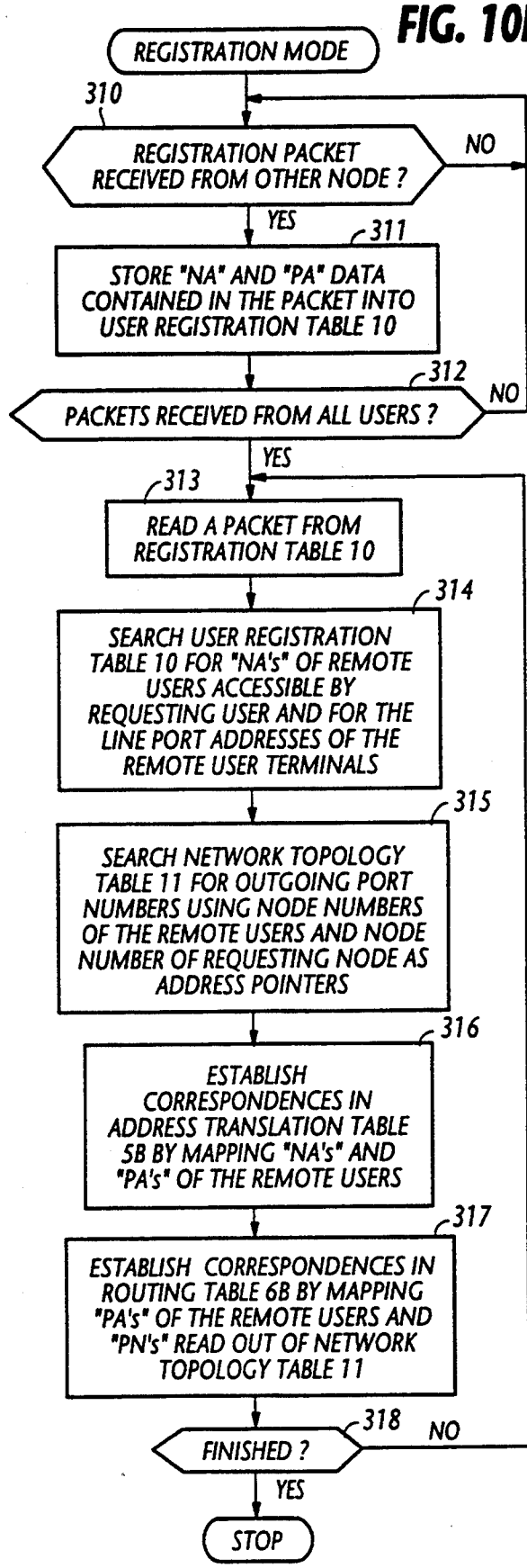

MULTI-PROTOCOL PACKET SWITCHING NETWORK

BACKGROUND OF THE INVENTION

1. Field of the Invention

The present invention relates generally to packet communication systems and more specifically to a technique for establishing a connection in a packet-switched network, using a signaling packet. The present invention is particularly suited for asynchronous transfer mode (ATM) switched networks.

2. Description of the Related Art

Routing addresses used in an ATM-switched network are defined by the CCITT Recommendations E. 164 and are known as ISDN (integrated services digital network) addresses or E. 164 addresses. According to the CCITT Recommendations E. 164, each port of any node of an ATM network is uniquely identified by a port address composed of an area code, a node number and a port number. In local area networks (LAN), user terminals are identified by a network address as defined by a network layer protocol such as Internet Protocol. If one or more private LAN's is to be supported by an ATM network, address resolution is necessary to convert the network address of a destination user to a port address before establishing a connection. This requires a source user terminal to broadcast an address conversion request to destination user terminals or inquire an address translation server, thus generating a substantial amount of undesired overhead traffic which increases disproportionately as the network size increases. In addition, multi-protocol users of different protocols coexist in a local area network. Multi-protocol routers are available for supporting such applications. However, no universal address scheme exists that can be used in common by the different protocols. If an ATM system were to be operated in a multi-protocol environment, one approach would be to provide an address resolution protocol for each user terminal for converting a network address to a corresponding E. 164 address. However, a substantial amount of burden is placed on the user for protocol processing. Another approach is to simultaneously operate a plurality of protocol routers in parallel fashion. However, each node of the network would be required to simultaneously operate different protocols. This results in system complexity.

SUMMARY OF THE INVENTION

It is therefore an object of the present invention to provide a packet switched network capable of supporting multi-protocol LAN user terminals without placing burdens on the user terminals and without generating undesired overhead traffic.

According to the present invention, there is provided a packet switched network comprising a plurality of network nodes interconnected by transmission links, each of the network nodes having a plurality of ports identified by a port address containing a node number and a port number. Each LAN user terminal transmits a signaling packet when establishing a connection for transporting information-bearing packets, containing in it a source network address including a protocol identifier and a source user address and a destination network address containing the protocol identifier and a destination user address. Each of the network nodes comprises a memory for establishing correspondences between the network addresses of remote user terminals connected to the ports of a remote network node, the port addresses of the remote user terminals, and the port numbers of the ports of the local network node through which the local user terminals are accessible to the remote user terminals. The network node responds to the signaling packet from a source user terminal by detecting in the memory a port address and a port number corresponding to the destination network address contained in the packet and appending the detected port address to the packet and transmitting the signaling packet containing the port address to one of the ports of the local network node according to the detected port number.

BRIEF DESCRIPTION OF THE DRAWINGS

The present invention will be described in further detail with reference to the accompanying drawings, in which:

FIG. 3 is a schematic block diagram of an example packet-switched network of the present invention for describing operations of the network during a signaling mode;

FIG. 5 is a block diagram of an example packet-switched network which embodies a modified embodiment of the present invention;

FIG. 6 is a block diagram of the signaling controller and the associated circuitry of a peripheral network node of FIG. 5;

FIG. 7 is a block diagram of the signaling controller and the associated circuitry of the central network node of FIG. 5;

FIG. 8 is an illustration of a network topology table provided in the central network node;

FIG. 9A is a flowchart of the operation of a peripheral network node of FIG. 8 during a signaling mode and FIG. 9B is a flowchart of the operation of the central network node during the signaling mode; and FIG. 10A is a flowchart of the operation a peripheral network node of FIG. 8 during a registration mode and FIG. 10B is a flowchart of the operation of the central network node during the registration mode.

DETAILED DESCRIPTION

Figure 1:
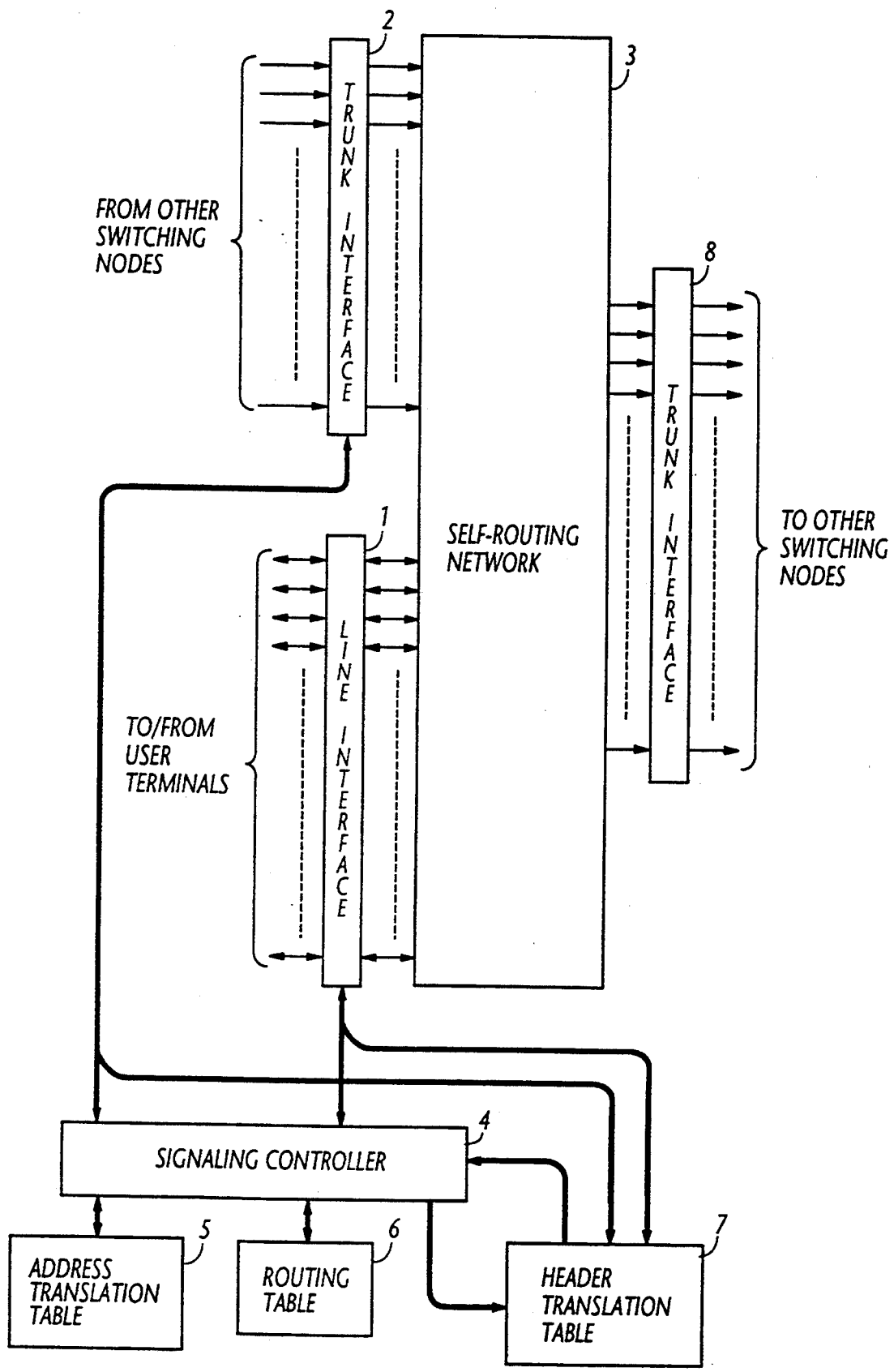
FIG. 1 is a block diagram of an asynchronous transfer mode (ATM) network node according to an embodiment of the present invention.

Referring now to FIG. 1, there is shown an asynchronous transfer mode (ATM) switching system which functions as a network node of a multi-protocol packet-switched network according to the present invention. Subscriber lines are terminated at a line interface module 1 which is connected to line ports of a self-routing network 3 and to a signaling controller 4. Trunks from other network nodes are connected to an incoming trunk interface module 2 which is in turn connected to incoming trunk ports of the self-routing network 3 and to the controller 4. The self-routing network 3 has outgoing trunk ports that are connected via an outgoing trunk interface unit 8 to other network nodes through transmission links. Each of the line and trunk ports of the network node are identified by a port number (PN) unique to that node and identified networkwise by a port address (PA) which consists a node number identifying the network node and the port number. Each user terminal is a terminal of a local area network (LAN) and communicates with other LAN user terminals using one or more protocols by designating the destination with a network address (NA) which consists of a protocol number identifying the protocol to be used for a communication and a user address uniquely identifying the user terminal. When establishing a connection, a source user terminal sends a signaling packet containing a header, a network address of the source user (SNA) and a destination network address. Once a connection is established, the source user terminal sends a message packet which contains a header and an information signal that follows.

To the controller 4 are connected an address translation table 5, a routing table 6 and a header translation table 7. As will be described later in detail, correspondences between network addresses (NA's) and port addresses (PA's) are mapped in the address translation table 5 so that a port address is read out of the translation table 5 corresponding to a network address contained in a signaling packet from a source user. Routing table 6 is a map that defines correspondences between port addresses and port numbers of remote user terminals as well as local user terminals. In each network node, the port numbers stored in the routing table 6 for the remote users indicate those outgoing trunk ports that are connected to the network nodes of the remote users, while the port numbers stored in routing table 6 for the local users are the port numbers of the subscriber lines to which they are connected.

Header translation table 7 is of a known design which provides header translation of both signaling and message packets by rewriting their header for routing them through the self-routing network 3 to a desired outgoing trunk port or a desired line port. As will be described, the contents of header translation table 7 are altered during a signaling mode by controller 4 in accordance with a port number (PN) which is read out of routing table 6 in response to receipt of the signaling packet and provides header translation of the signaling packet. Header translation table 7 is also connected to line interface module 1 and trunk interface module 2 during a subsequent communication mode to provide header translation of message packets according to the altered contents.

Figure 2:
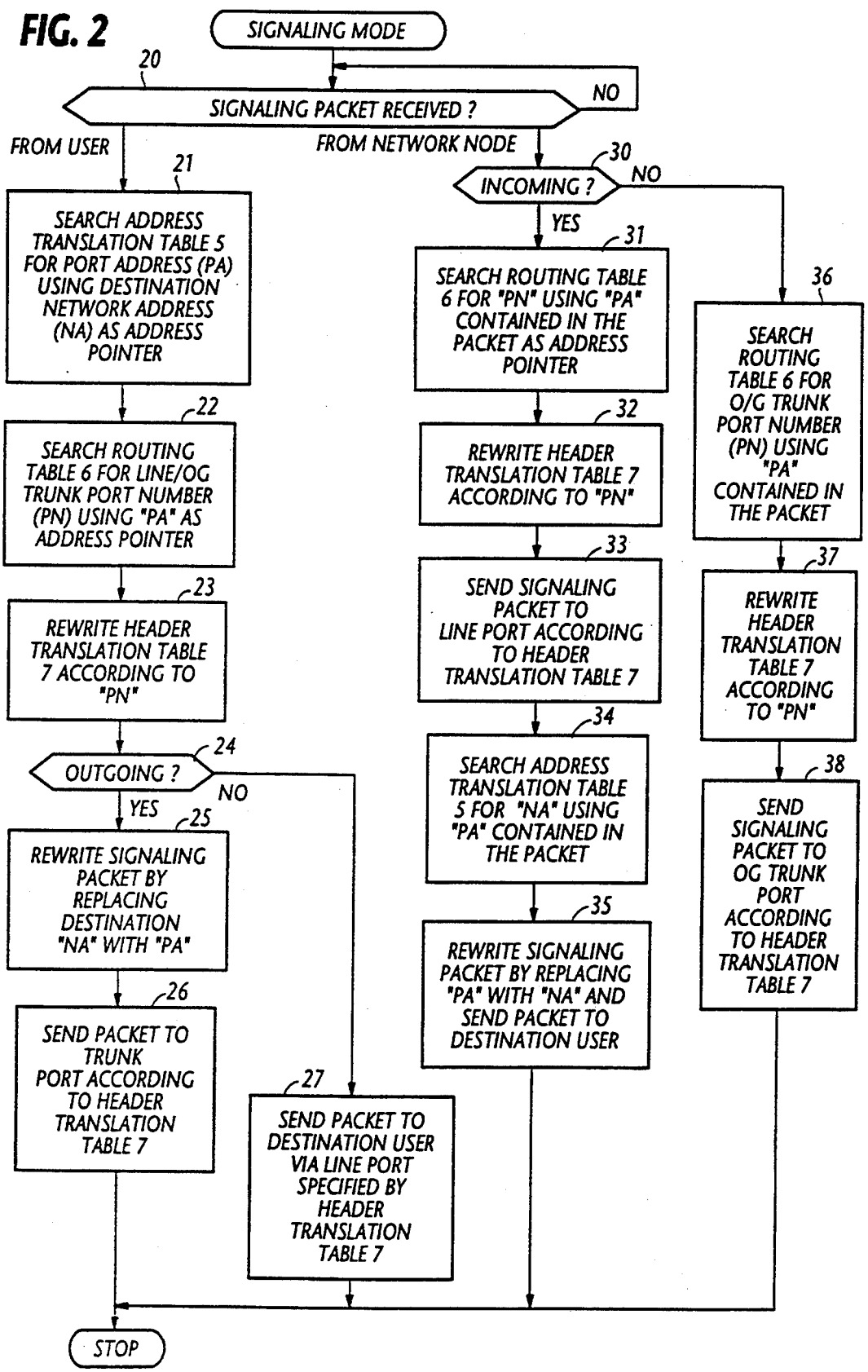
FIG. 2 is a flowchart describing programmed instructions performed by a signaling controller during a signaling mode.

During a signaling mode, signaling controller 4 receives a signaling packet from interface module 1 or 2 and operates according to programmed instructions described in a flowchart shown in FIG. 2.

In FIG. 2, the program execution of signaling mode starts with step 20 which checks to see if a signaling packet is received from a user terminal or another network node. If an outgoing or intranode signaling packet is received from a user terminal, control branches at decision step 20 to step 21 to search the address translation table 5 for a port address using the destination network address (DNA) contained in the received packet as an address pointer and read out the corresponding port address from the address translation table 5. Control proceeds to block 22 to make a search through the routing table 6 for a line or outgoing trunk port number (PN) using the port address must read out of the address translation table 5 as an address point to read the corresponding port number from the routing table 6. At step 23, control rewrites the routing information stored in the header translation table 7 in accordance with the port number (PN) read out of the routing table 5 so that packets are routed to a desired port. Control advances to decision step 24 to check to see if the signaling packet is an outgoing or intranode packet. If the signaling packet is an outgoing packet, control branches at step 24 to step 25 to rewrite the header of the signaling packet by converting its destination network address (DNA) to the port address (PA) read out of the routing table 6.

At step 26, controller 4 sends the outgoing signaling packet to the self-routing network 3 so that it is routed to an outgoing trunk port according to the contents of the packet header. More specifically, before the packet is launched into the self-routing network 3, controller 4 allows the line interface module 1 to read routing information from the header translation table 7 and rewrite the header of the signaling packet according to the retrieved routing information so that the packet is routed through the self-routing network 3 to a desired port.

If the signaling packet is determined at step 24 to be an intranode packet, i.e., destined to a local user of the network node, control branches to step 27 to allow the line interface module 1 to retrieve routing information from the header translation table 7 and rewrite the packet header with the retrieved information and launch the signaling packet to the self routing network 3 so that it is routed to an outgoing line port of the network that can access the destination user terminal.

If an incoming or transit signaling packet is received from a remote network node, control branches at step 20 to decision step 30 to determine if the packet is an incoming or transit packet. If incoming, control branches out to step 31 to search the routing table 6 for a port number (PN) using the PA data contained in the packet as an address pointer to read it from the routing table. At step 32, control rewrites the header translation table 7 according to the port number (PN) just read out of the routing table 6, and proceeds to step 33 to allow the incoming signaling packet to be header-translated according to the altered routing information of the header translation table 7 and sent to the self-routing network 3 where it is routed to a destination line port. At step 34, control makes a search through the address translation table 5 for the network address (NA) of the destination user terminal, using the packet address (PA) contained in the packet as an address pointer. At step 35, the port address of the packet is converted to the network address of the destination user and the packet is sent to the destination user terminal.

If the received signaling packet is a transit packet, control branches at step 30 to step 36 to search the routing table 6 for an outgoing trunk port number (PN) using the port address contained in the packet as an address pointer and reading the port number from the routing table. At step 37, the header translation table 7 is rewritten according to the port number (PN) just read out of the routing table 6. At step 38, the trunk interface module 2 is allowed to rewrite the header of the transit signaling packet according the header translation table 7 and sent to an outgoing trunk port of the self-routing network 3.

The operation of the packet-switched network using the signaling method of the present invention will be better understood with the following description given with reference to FIG. 3 by assuming that a signaling packet is sent from a source user terminal 53 (identified by user address A) of a network node 50 having node number=1 to a destination user terminal 63 of a network node 60 having node number=2, using a protocol 1. A trunk port PN=10 (PA=1–10) of network node 50 is connected to a trunk port PN=20 (PA=2–20) of network node 60. A trunk port PN-11 (PA-1-11) of network node 50 is connected to a trunk port of PN=30 of a network node 70 (with node number-4) which serves as a transit node between nodes 50 and 80. A trunk port PN=41 of node 70 is connected to a trunk port PN=10 of node 80 with node number=4. The transit node 70 is provided with a routing table 71 and node 80 is provided with an address translation table 81 and a routing table 82.

Network node 50 is provided with an address translation table 51 and a routing table 52. In the address translation table 51 are mapped correspondences between network addresses (NA's) of the local user terminals 53, 54 and 55 and their port addresses (PA's). The user terminals are terminated at line ports with port numbers PN=1, PN=2 and PN=3, respectively, and hence their port addresses are given by PA=1—1, PA=1-2, PA=1-3, respectively. Therefore, protocol network address NA(=protocol 1-A) can be translated to PA(=1—1) by reading the port address from the address translation table 51. The address translation table 51 further stores NA-PA translation data of remote user terminals 63, 64, 65 of node 60 and a remote user terminal 83 of node 80 (with node number =4) which is connected through transit node 70 (with node number=3) to node 50. Remote user terminals 63, 64, 65 are connected to line ports with port numbers PN=1, PN=2 and PN=3, respectively, and hence their port addresses are given by PA=2-1, PA=2—2, PA=2-3, respectively. Remote terminal 83 is connected to line port identified by PN=1 and PA=4-1. The network addresses of remote user terminals 63, 64, 65 and 83 in the address translation table 51 are represented respectively as protocol 1-D, 2-E, 3-F and 1-G, and their port addresses are stored corresponding to these network addresses.

Network node 50 has a routing table 52 in which the PA-PN relationships of the local user terminals are stored in addition to those of the remote user terminals. Since remote user terminals 63, 64, 65 are accessed through the trunk port PA=1 10 from the users of node 50, the port numbers PA=10 are stored in the routing table 52 corresponding to the port addresses 2-1, 2—2, 2-3 of these remote users. In addition, port number PN=11 is stored in the routing table 52 corresponding to the port address PA=4-1 of remote user terminal 83. In a similar manner, network node 60 has an address translation table 61 storing NA-PA relationships of both local and remote users and a routing table 62 storing their PA-PN relationships as illustrated. Since remote user terminals 53, 54 and 54 are accessible through trunk port PN=20 from users of node 60, their port numbers are represented as PN=20 in routing table 62.

In operation, the source user terminal 53 sends a signaling packet P1 to network node 50, containing in it a header, a source network address (SNA=protocol 1-A) and a destination network address (DNA=-protocol 1-D). In response to the destination network address of the packet, network node 50 reads the corresponding port address PA=2-1 from a location of the address translation table 51 (step 21) as marked by dotted lines 56 in FIG. 3. In response to the port address PA=2-1, the corresponding port number PN=10 is read from a location of the routing table 52 as marked by dotted lines 57 (step 22) and is used to rewrite the header translation table of node 50 (step 23). The NA data of the signaling packet P1 is then replaced with the port address PA=2-1 (step 25) and routed to trunk port PA=1-10 and transmitted to trunk port PA=2–20 as a packet P2 (step 26).

On receiving the packet P2 from node 50, node 60 searches the routing table 62 for a port number PN=1, using the port address PA=2-1 contained in the packet as an address pointer and reads that port number from a location as marked by numeral 58 (step 31) and rewrites the header translation table of node 60 according to the port number PN-1 (step 32). The signaling packet is then routed through the self-routing network of node 60 to the line port PN-1 of destination user terminal 63 according to its header translation table (step 33). Then, the address translation table 61 is searched for the network address of the destination terminal using the PA=2-1 data contained in the packet (step 34) as an address pointer and read the DNA=protocol 1-D from a location of the address translation table 61 as indicated by numeral 59. The PA data of the packet is then replaced with the DNA data just read out of the address translation table (step 35) and sent out to the destination user terminal 63 as a packet P3.

Upon receiving the signaling packet from user terminal 53, the destination user terminal 63 will return a packet indicating that it is ready to receive message packets that follow. Message packets from the source user terminal 53 are propagated through the network according to the routing information of the header translation tables of the nodes 50 and 60 altered by the preceding signaling packet.

If user terminal 53 desires to communicate with user terminal 83 with protocol 1, it sends a signaling packet containing a destination network address (DNA=-protocol 1-D) to node 50 where it is converted to port address PA-4-1 according to the address translation table 51 and sent via trunk port PN=11 as a packet P4 to the trunk port PN=30 of transit node 70. On receiving the packet P4 at incoming trunk port PN=30, transit node 70 reads an outgoing trunk port PN=41 from the routing table 71 using the port address PA=4-1 contained in the packet as an address pointer (step 35). The header translation table of the transit node 70 is rewritten according to the port number PN=41 (step 36). The signaling packet is then transferred from incoming trunk port PN=30 to outgoing trunk port PN=41 and thence to an incoming trunk port PN 10 of the destination node 80.

In response to the incoming signaling packet, the destination node 80 makes a search through the routing table 82 for a line port number (PN) corresponding to the PA=4-1, reads the corresponding port number PN=1 from the routing table (step 31), rewrites the header translation table of the node 80 according to the port number PN=1 (step 32), and sends the packet to the destination line port PN-1 according to the header translation table (step 33). The address translation table 81 is then searched for a network address corresponding to the port address PA=4-1 of the signaling packet (step 34) and the port address PA=4-1 of the packet is converted to the destination network address NA=-protocol 1-G and the packet is forwarded to the destination user terminal 83 as a packet P5 (step 35).

Figure 4:
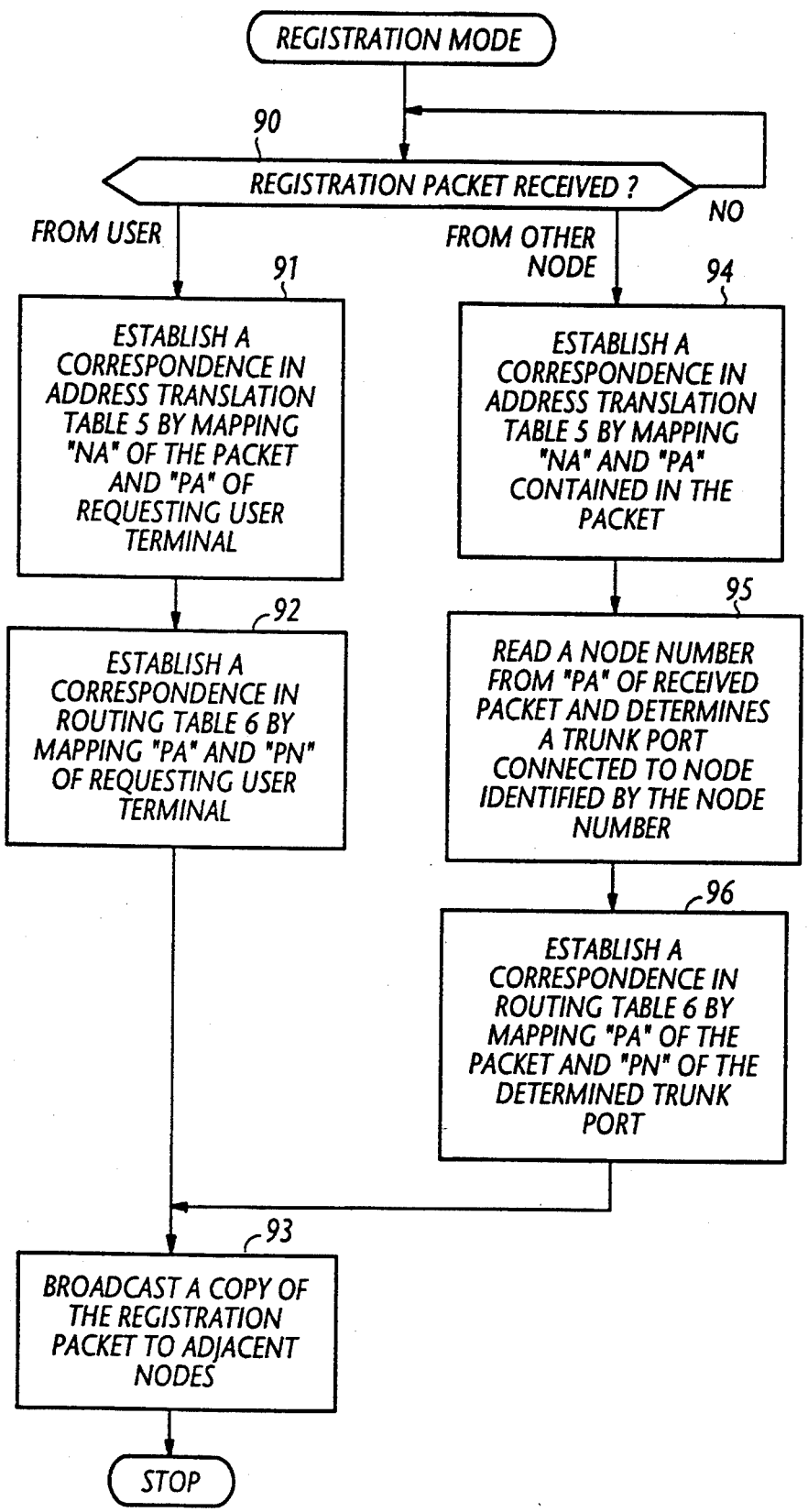
FIG. 4 is a flowchart describing programmed instructions performed by the signaling controller during a registration mode.

While mention has been made of the signaling mode of the switched network, the controller 4 operates by storing data into the address translation tables and routing tables of all network nodes during a registration mode. FIG. 4 is a flowchart of the operation of the controller 4 which is performed during the registration mode. When a user terminal is connected to a line port of a serving network node, it sends a registration packet to the serving network node, containing the network address of the requesting terminal.

In FIG. 4, the program execution of a registration mode starts with decision step 90 which checks to see if a registration packet is received from a user or from other node. If a packet is received from a user, control branches at step 90 to step 91 to establish a correspondence in the address translation table 5 by mapping the network address contained in the received packet and the port address of the line port to which the requesting user terminal is connected. Control exits to step 92 to establish a correspondence in the routing table 6 by mapping the port address and port number of that line port. Then, a copy of the registration packet is broadcast from the serving network node to adjacent network nodes.

Upon receiving a copy of the registration packet from an adjacent network node, the controller 4 of each network node branches at step 90 to step 94 to establish a correspondence in the address translation table 5 by mapping the network address and the port address both contained in the received packet. Exit then is to step 95 to read a node number contained in the port address of the packet to determine a trunk port that is connected to a network node identified by that node number. At step 96, a correspondence is established in the routing table 6 by mapping the port address contained in the packet and a port number that identifies the determined trunk port. Control then exits from step 96 to step 93 to broadcast a copy of the received registration packet to adjacent network nodes. As the registration packets propagate through the network, data necessary for the subscribed user terminal is input to and stored in the address translation tables and routing tables of all network nodes will be updated. As a new subscription is made, the above process is repeated to update the address translation tables and routing tables of all network nodes.

In the previous embodiment, the routing information of remote user terminals are stored in the address translation table as well as in the routing table of each network node. A modified embodiment will be described with reference to FIGS. 5-8, 9A, 9B, 10A and 10B in which the outing information of remote user terminals are stored in a central network node, or address server. In FIG. 5, an example packet switched network comprises four peripheral network nodes 101~104 (node #1~#4) and a central node 105 (node #5) serving as an address server located at a geographical center of the network. Peripheral nodes 101~104 have their trunk ports connected to adjacent peripheral nodes by data links 106 and connected to the central node 105 by data links 107. Additionally, peripheral nodes 101~104 are connected to the central node by signaling links 108.

As illustrated in FIG. 6, each of the peripheral network nodes 101~104 has a cache memory 9 in addition to address translation table 5A and routing table 6A, all of which are connected to signaling controller 4A. Header translation table 7A is also connected to the controller 4A in a manner similar to the embodiment of FIG. 1. Address translation table 5A and routing table 6A store the NA-PA and PA-PN translation data, respectively, of local users of the peripheral network node. The signaling controller 4A is connected by signaling link 108 to the signaling controller 4B of the central network node 105 which is shown in FIG. 7.

Central network node 105 includes a remote user registration table 10, a network topology table 11 in addition to address translation table 5B and routing table 6B, all of which are connected to the signaling controller 4B. Header translation table 7B is connected to the signaling controller 4B in the same manner as in FIG. 1. Signaling controller 4B is connected by signaling links 108 to the peripheral network nodes 101~104. Address translation table 5B and routing table 6B store the NA-PA and PA-PN translation data, respectively, of local users of the central network node 105 and those of remote users. User registration table 10 stores the network addresses of all user terminals registered to the network and their local port addresses. Network topology table 11 stores for each registration requesting node a set of port numbers of outgoing trunk ports connected to remote nodes as shown in FIG. 8. For example, if a registration request is sent from a user at node #1 to the node #5, the requesting user is accessible to remote nodes #2, #3, #4 and #5 through trunk ports PN=12, PN=10, PN=11 and PN=11, respectively (see also FIG. 5).

Figure 9B:
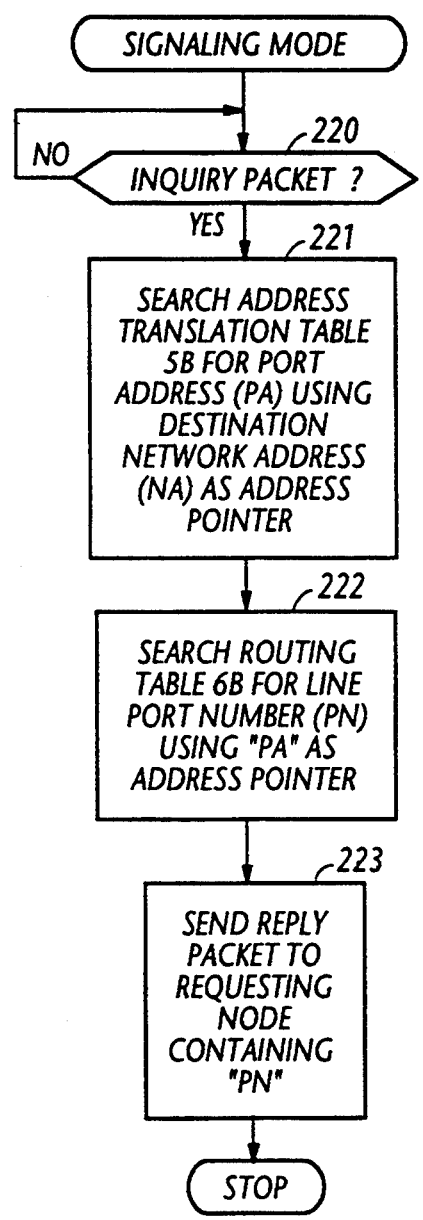

The operation of the signaling controllers of the network of FIG. 5 during a signaling mode will be described with reference to flowcharts shown in FIGS. 9A and 9B. In FIG. 9A, program execution of the signaling controller 4A of each peripheral node starts with step 200 to check to see if a signaling packet is received from a user terminal or from a network node. If a packet is received from a user terminal, control branches at step 200 to step 201 to search the address translation table 5A and cache memory 9 for a port address using the destination network address contained in the packet as an address pointer. Exit then is to decision step 202 to determine whether a corresponding port address is detected in the address translation table for the received signaling packet. If it is, control branches at step 202 to step 203 to search the routing table 6A for a line port number (PN) using the port address detected at step 201 as an address pointer. At step 205, header translation table 7A is rewritten according the line port number PN. At step 206, the destination of the signaling packet is then checked. If it is an outgoing packet, control branches at step 206 to step 207 to replace the destination network address of the signaling packet with the port address detected either at step 203 or step 204. The signaling packet is then sent to an outgoing trunk port according to the header translation table 7A (step 208). If the packet is an intranode packet, it is sent to the destination user terminal via a line port specified by the header translation table 7A.

If no port number is detected in the address translation table at step 202, control branches to step 204 to send an inquiry packet to the central node 105 to receive the port address and port number of an outgoing trunk port and stores the destination address and the received "PA" and "PN" data of the trunk port into the cache memory 9, and moves on to step 205 followed by steps 206 to 209.

Upon receiving an inquiry packet from a peripheral node (step 220, FIG. 9B), the signaling controller 4B of address server 105 searches the address translation table 5B for a port address corresponding to the destination network address of the requesting user (step 221). Exit then is to step 222 to search the routing table 6B for a line port number corresponding to the port address detected at step 221. Control proceeds to step 223 to send a reply packet to the requesting node containing the line port number detected at step 222. This packet will be received by the signaling controller 4A of the requesting node and the port number contained in it is stored into the cache memory 9 together with the network address of the requesting user.

Returning to FIG. 9A, if a signal packet is received from a network node, control branches at step 200 to step 210 to search the routing table 6A to detect a port number (PN) corresponding to the PA data contained in the packet. At step 211, control rewrites the header translation table 7A according to the detected port number (PN), and proceeds to step 212 to send the signaling packet according to the header translation table 7A. At step 213, control makes a search through the address translation table 5A to detect the network address (NA) of the destination user terminal corresponding to the packet address (PA) contained in the packet. At step 214, the port address of the packet is converted to the network address of the destination user and the packet is sent to the destination user terminal.

Assume that a signaling packet destined to a user terminal 134 (=protocol 1-J) is sent from a user terminal 130 to node 101. The address translation table 5A-1 of node 101 is searched (step 201) to detect the destination user. If the destination user is not detected in the address translation table 5A-1 (step 202), signaling controller 4A sends an inquiry packet to node 105 (step 204). In response, the signaling controller 4B of node 105 searches its address translation table 5B and detects the corresponding port address PA-3-1 (step 221) and goes on to search the routing table 6B to detect the corresponding line port number PN=10 (step 212). A reply packet containing the data (PN=10 is sent from the address server to node 101 (step 223). The header translation table of node 101 is then rewritten with the content of the reply packet (step 205), and the network address of the signaling packet from the user 130 is converted to the port address (step 207) and sent to a trunk port according to the header translation table of node 101. This packet is received at the trunk port PN=20 of node 103 and steps 210 through 214 are successively executed, using the address translation table 5A-3 and routing table 6A-3 of node 103, and the packet is directed to the destination user terminal 134.

During a registration mode, the operation of the signaling controller of each peripheral network node and the operation of the signaling controller of central node 105 proceed as shown in FIGS. 10A and 10B. In FIG. 10A, if a registration request packet is received from a user terminal (step 300), a correspondence is established in the local address translation table 5A by mapping the network address of the packet and the line port address of the requesting user terminal (step 301). At step 302, a correspondence is established in the routing table 5B by mapping the port address and the port number of the requesting user terminal. At step 303, a registration packet is sent containing the network address and the port address of the user terminal to node 105.

In FIG. 10B, if a registration request packet is received from a network node (step 310), the NA and PA data contained in the received packet are stored into the user registration table 10 (step 311). If registration packets are not received from all users, steps 310 and 311 are repeated until all users are registered. At step 313, a registration packet is read out of the registration table 10 as a source user terminal and at step 314 a set of remote user terminals is searched for the source user and the network addresses and the line port addresses of the remote users are read out of the registration table 10. At step 315, the network topology table 11 is searched for the port numbers of outgoing trunk ports which will be used when connections are established between the source user node and those remote nodes having the line port addresses detected at step 314. Exit then is to step 316 to establish correspondences in the address translation table 5B by mapping the network addresses and the line port addresses of the remote user terminals. At step 317, correspondences are established in the routing table 6B by mapping the line port addresses of the remote users and the port numbers read out of the network topology table 11. Decision step 318 is executed to repeat steps 313 to 317 until remote user data are created for all registered users.

Assume that a registration request is transmitted from user terminal 130. The NA/PA and PA/PN data of user terminal 130 is registered in the address translation table 5A-1 and routing table 6A-1 of node 101 when these terminals send a registration request packet, and those of user terminals 124, 125 and 126 are registered in the address translation table 5A-3 and routing table 6A-3 of node 103.

Following the registration procedure of a peripheral network node in response to a registration packet from a user terminal, the packet is sent to the central node 105 (step 303). The NA=protocol 1-A and PA=1—1 of contained in the registration packet from user terminal 130, for example, are stored in the user registration table 10 for subscription (step 311). User registration table 10 is then searched and the network addresses of remote user terminals 133, 134, 137, and 138 (protocol 1-H, 1-J, 1-K, 1-L) and the line port addresses PA-2-1, PA=3-1, PA=4-1, and PA=5 1 are detected because these remote user terminals are accessible by the requesting user terminal 130, provided that protocol 1 is used for transmission (step 314). By using the node numbers contained in these line port numbers as remote nodes and the node number of node 101 as a registration requesting node, network topology table 11 is searched and outgoing port numbers (PN=12, PN=10, PN=11 and PN=11 are detected (step 315). The network addresses NA=protocol 1-H, 1-J, 1-K, 1-L and corresponding line port addresses PA=2-1, PA=3-1, PA=4-1, and PA=5-1 are stored in the address translation table 5B (step 316), and the line port addresses PA=2-1, PA=3-1, PA=4-1, and PA=5-1 and the corresponding port numbers PN=12, PN=10, PN=11 and PN=11 are then stored into the routing table 6B (step 317) as shown in FIG. 5.

What is claimed is:

1. A packet switched network comprising:
    a plurality of network nodes interconnected by transmission links, each of said network nodes having a plurality of ports, each of the ports being identified by a port address containing a node number and a port number, each of said transmission links being connected between the ports of said network nodes;
    a plurality of local area network user terminals connected to the ports of said network nodes, at least one of the local area network user terminals functioning as a source user terminal for transmitting a signaling packet when establishing a connection and subsequently transmitting an information-bearing packet through the established connection, said signaling packet containing a source network address containing a protocol identifier and a user address identifying the source user terminal and a destination network address containing said protocol identifier and a user address identifying one of the local area network user terminals as a destination user terminal;

each of said network nodes serving local user terminals among said plurality of local area network user terminals as a local network node and comprising:

memory means for establishing correspondences between a plurality of network addresses of said local user terminals and remote user terminals connected to ports of a remote network node and a plurality of port addresses of ports of said local user terminals and said remote user terminals, and between a plurality of port addresses and port numbers of the ports of said local user terminals and said remote user terminals; and means responsive to the signaling packet received from said source user terminal for detecting in said memory means a port address and a port number corresponding to the destination network address contained in the signaling packet and appending the detected port address to the signaling packet and transmitting the signaling packet containing said port address to one of said ports of the local network node or one of said ports of the remote network node according to the detected port number.

2. A packet switched network comprising:

a plurality of network nodes interconnected by transmission links, each of said network nodes having a plurality of ports, each of the ports being identified by a port address containing a node number and a port number, each of said transmission links being connected between the ports of said network nodes;

a plurality of local area network user terminals connected to the ports of said network nodes, at least one of said local area network user terminals functioning as a source user terminal for transmitting a first signaling packet when establishing a connection and subsequently transmitting an information-bearing packet through the established connection, said first signaling packet containing a source network address containing a protocol identifier and a user address identifying the source user terminal and a destination network address containing said protocol identifier and a user address identifying one of said local area network user terminals as a destination user terminal;

each of said network nodes serving local user terminals among said plurality of local area network user terminals as a local network node and comprising:

memory means for establishing correspondences between a plurality of network addresses of said local user terminals and remote user terminals connected to ports of a remote network node and a plurality of port addresses of ports of said local user terminals and said remote user terminals, and between a plurality of port addresses and port numbers of the ports of said local user terminals and said remote user terminals;

means responsive to the first signaling packet received from said source user terminal for detecting in said memory means a port address and a port number corresponding to the destination network address contained in the first signaling packet and converting the destination network address contained in said first signaling packet to the detected port address, and transmitting the first signaling packet containing said port address to one of said ports of the local network node or one of said ports of the remote network node according to the detected port number; and means responsive to a second signaling packet containing said port address from another network node for detecting in said memory means a network address and a port number corresponding to the port address contained in the second signaling packet and converting the port address contained in the second signaling packet containing said network address to one of said ports of the local network node or one of said ports of the remote network node according to the detected port number.

3. A packet switched network comprising:

a plurality of network nodes interconnected by transmission links, each of said network nodes having a plurality of ports, each of the ports being identified by a port address containing a node number and a port number, each of said transmission links being connected between the ports of said network nodes;

a plurality of local area network user terminals connected to the ports of said network nodes, at least one of said user terminals functioning as a source user terminal for transmitting a first signaling packet when establishing a connection and subsequently transmitting an information-bearing packet through the established connection, said first signaling packet containing a source network address containing a protocol identifier and a user address identifying the source user terminal and a destination network address containing said protocol identifier and a user address identifying one of the local area network user terminals as a destination user terminal;

each of said network nodes serving local user terminals among said plurality of local area network user terminals as a local network node and comprising:

memory means for establishing correspondences between a plurality of network addresses of said local user terminals and remote user terminals connected to ports of a remote network node and a plurality of port addresses of the ports of said local user terminals and said remote user terminals, and for establishing correspondences between a plurality of port addresses and port numbers of the ports of said local user terminals and said remote user terminals;

means responsive to the first signaling packet received from said source user terminal for detecting in said memory means a port number corresponding to the destination network address contained in the first signaling packet if the first signaling packet is destined to one of said local user terminals and transmitting the first signaling packet to one of the ports of the local network node according to the detected port number, and for detecting in said memory means a port address and a port number corresponding to the destination network address contained in the first signaling packet if the first signaling packet is destined to one of said remote user terminals, appending the detected port address to the first signaling packet and transmitting the first signaling packet to one of the ports of the local network node or one of said ports of the remote network node according to the detected port number; and means responsive to a second signaling packet containing said port address from another network node for detecting in said memory means a port number corresponding to the port address contained in the second signaling packet and transmitting the second signaling packet to one of the ports of the local network node or one of said ports of the remote network node according to the detected port number.

4. A packet switched network comprising:

a plurality of network nodes interconnected by transmission links, each of said network nodes having a plurality of ports, each of the ports being identified by a port address containing a node number and a port number, each of said transmission links being connected between the ports of said network nodes;

a plurality of local area network user terminals connected to the ports of said network nodes, at least one of said local area network user terminals functioning as a source user terminal for transmitting a first signaling packet when establishing a connection and subsequently transmitting an information-bearing packet through the established connection, said first signaling packet containing a source network address containing a protocol identifier and a user address identifying the source user terminal and a destination network address containing said protocol identifier and a user address identifying a destination user terminal;

each of said network nodes serving local user terminals among said plurality of said local area network user terminals as a local network node and comprising:

memory means for establishing correspondences between a plurality of network addresses of said local user terminals and remote user terminals connected to ports of a remote network node and a plurality of port addresses of the ports of said local user terminals and said remote user terminals, and for establishing correspondences between a plurality of port addresses of the ports of said local user terminals and said remote user terminals;

means responsive to the first signaling packet receiving from said source user terminal for detecting in said memory means a port number corresponding to the destination network address contained in the first signaling packet if the first signaling packet is destined to one of said local user terminals and transmitting the first signaling packet to one of the ports of the local network node according to the detected port number, and for detecting in said memory means a port address and a port number corresponding to the destination network address contained in the first signaling packet if the first signaling packet is destined to one of said remote user terminals, converting the destination network address contained in the first signaling packet to one of the ports of the local network node or one of said ports of the remote network node according to the detected port numbers; and means responsive to a second signaling packet containing said port address from another network node for detecting in said memory means a port number and a network address corresponding to the port address contained in the second signaling packet, converting the port address contained in the second signaling packet containing the network address to one of the ports of the local network node or one of said ports of the remote network node according to the detected port number.

5. A packet switched network as claimed in claim 1, 2, 3 or 4, wherein each of said local user terminals transmits a first registration packet requesting registration, each first registration packet containing a source network address containing a protocol identifier and a user address identifying the requesting local user terminal, further comprising:

means for writing into said memory means a correspondence between the network address contained in each first registration packet, a port address and a port number of the port to which said requesting user terminal is connected, and broadcasting each first registration packet to adjacent network nodes;

means responsive to a second registration packet received from another network node for writing into said memory means a correspondence between the network address contained in the second registration packet and a port address of the port to which said requesting user terminal is connected and a port address of a port of the local network node through which the local user terminals are accessible to the remote user terminals of said another network node, and broadcasting the second registration packet to adjacent network node.

6. A packet switched network comprising:

a plurality of network nodes interconnected by transmission links, each of said network nodes having a plurality of ports, each of the ports being identified by a port address containing a node number and a port number, each of said transmission links being connected between the ports of said network nodes;

a plurality of local area network user terminals connected to the ports of said network nodes, at least one of said local area network user terminals functioning as a source user terminal for transmitting a first signaling packet when establishing a connection and subsequently transmitting an information-bearing packet through the established connection, said first signaling packet containing a source network address containing a protocol identifier and a user address identifying the source user terminal and a destination network address containing said protocol identifier and a user address identifying a destination user terminal;

an address server comprising central memory means for establishing correspondences between a plurality of network addresses of user terminals connected to ports of each of said network nodes, a plurality of port addresses of the ports of the user terminals, and a plurality of port numbers of the ports of each network node through which the user terminals of the network node are accessible to the user terminals of each of other network nodes;

each of said network nodes serving local user terminals among said plurality of local area network user terminals as a local network node and comprising:

local memory means for establishing correspondences between a plurality of network addresses of said local user terminals and remote user terminals connected to ports of a remote network node and a plurality of port addresses of ports of said local user terminals and said remote user terminals, and between a plurality of port numbers and a plurality of ports addresses of the ports of said local user terminals and said remote user terminals;

means responsive to the first signaling packet received from said source user terminal for detecting in said local memory means a port number corresponding to the destination network address contained in the first signaling packet if the first signaling packet is destined to one of said local user terminals and transmitting the first signaling packet to one of the ports of the local network node according to the detected port number, and for transmitting an inquiry packet to said address server if said port number is not detected in said local memory means, said inquiry packet containing the same destination network address as contained in said first signaling packet;

said address server further comprising means responsive to said inquiry packet for detecting in said central memory means a port address and a port number corresponding to the destination network address contained in the inquiry packet, and transmitting a reply packet containing the detected port address and port number to said local network node;

said local network node further comprising:

means responsive to said reply packet for converting the destination network address contained in the first signaling packet to the port address contained in the reply packet and transmitting the first signaling packet to one of the ports of the local network node or one of said ports of the remote network node according to the port number contained in the reply packet; and means responsive to a second signaling packet containing said port address from another network node for detecting in said local memory means a port number and a network address corresponding to the port address contained in the second signaling packet, converting the port address contained in the second signaling packet to the detected network address, and transmitting the second signaling packet containing the network address to one of the ports of the local network node or one of said ports of the remote network node according to the detected port number.

7. A packet switched network as claimed in claim 6, wherein said local memory means includes a cache memory for establishing a correspondence between the network address contained in the first signaling packet and the port address and the port number contained in the reply packet.

* * * * *